US012762363B2

(12) United States Patent
Tsai et al.

(10) Patent No.: US 12,762,363 B2
(45) Date of Patent: Oct. 13, 2026

(54) ELECTRONIC DEVICE WITH HYBRID POWER AND CHARGING METHOD

(71) Applicant: Getac Technology Corporation, New Taipei (TW)

(72) Inventors: Cheng-Han Tsai, Taipei (TW); Yng-Wei Lee, Taipei (TW)

(73) Assignee: Getac Technology Corporation, New taipei (TW)

(*) Notice: Subject to any disclaimer, the term of this patent is extended or adjusted under 35 U.S.C. 154(b) by 610 days.

(21) Appl. No.: 18/242,605

(22) Filed: Sep. 6, 2023

(65) Prior Publication Data

US 2024/0297523 A1 Sep. 5, 2024

Related U.S. Application Data

(60) Provisional application No. 63/449,272, filed on Mar. 1, 2023.

(51) Int. Cl.

| | |
|---|---|
| ***H02J 7/00*** | (2026.01) |
| ***G06F 1/26*** | (2006.01) |
| ***G06K 7/10*** | (2006.01) |
| ***G06K 7/14*** | (2006.01) |
| ***H01M 12/02*** | (2006.01) |
| ***H01M 50/528*** | (2021.01) |

(Continued)

(52) U.S. Cl.

CPC ....... *G06K 7/10722* (2013.01); *G06K 7/1413* (2013.01); *H01M 12/02* (2013.01); *H01M 50/528* (2021.01); *H02J 7/445* (2026.01); *H02J 7/50* (2026.01); *H02J 7/54* (2026.01); *H02J 7/56* (2026.01); *H02J 7/585* (2026.01); *H02J 7/60* (2026.01); *H02J 7/80* (2026.01); *H02J 7/82* (2026.01); *H02J 7/865* (2026.01); *H02J 7/933* (2026.01); *H02J 2207/10* (2020.01)

(58) Field of Classification Search

CPC ...... H02J 7/445; H02J 7/54; H02J 7/56; H02J 7/80; H02J 7/82; H02J 7/865; H02J 7/61; H02J 7/855; G06F 1/263; Y02E 60/10

USPC .......................................................... 320/134

See application file for complete search history.

(56) References Cited

U.S. PATENT DOCUMENTS 8,259,221 B1 9/2012 Kaplan et al.
2006/0244424 A1* 11/2006 Nelson .................... H02J 15/00 322/37

(Continued)

FOREIGN PATENT DOCUMENTS

EP 3454443 A1 3/2019
KR 20180074971 A 7/2018

(Continued)

*Primary Examiner* — Toan C Ly

(74) *Attorney, Agent, or Firm* — Troutman Pepper Locke LLP; Tim Tingkang Xia, Esq.

(57) ABSTRACT

A charging method includes detecting a system power, confirming that a hybrid power operation is executed when the system power is not less than a preset power and a hybrid power mechanism is turned on, forcibly disabling a timing operation when the hybrid power operation is executed, confirming that a charging operation is executed when the system power is less than the preset power and the hybrid power mechanism is turned on, starting the timing operation to accumulate a charging time when starting to execute the charging operation, and forcibly stopping the charging operation when the charging time is longer than a preset time.

14 Claims, 6 Drawing Sheets

(51) Int. Cl.

| | |
|---|---|
| ***H02J 7/40*** | (2026.01) |
| ***H02J 7/50*** | (2026.01) |
| ***H02J 7/54*** | (2026.01) |
| ***H02J 7/56*** | (2026.01) |
| ***H02J 7/60*** | (2026.01) |
| ***H02J 7/61*** | (2026.01) |
| ***H02J 7/80*** | (2026.01) |
| ***H02J 7/82*** | (2026.01) |
| ***H02J 7/90*** | (2026.01) |

(56) References Cited

U.S. PATENT DOCUMENTS

| | | | | |
|---|---|---|---|---|
| 2021/0184485 | A1 | 6/2021 | Moellenberg et al. | |
| 2021/0408818 | A1* | 12/2021 | Yang | H01M 10/44 |
| 2022/0045546 | A1* | 2/2022 | Ikui | B60L 53/52 |

FOREIGN PATENT DOCUMENTS

| | | | |
|---|---|---|---|
| TW | 201031072 | A | 8/2010 |
| TW | 201735431 | A | 10/2017 |

* cited by examiner

ELECTRONIC DEVICE WITH HYBRID POWER AND CHARGING METHOD

CROSS-REFERENCE TO RELATED APPLICATION

This application claims the benefit of U.S. provisional application Ser. No. 63/449,272, filed on Mar. 1, 2023. The entirety of the above-mentioned patent application is hereby incorporated by reference herein and made a part of the specification.

BACKGROUND OF THE INVENTION

Technical Field

The present disclosure relates to the technical field of charging control, and in particular to an electronic device with hybrid power and a charging method.

Related Art

With the development of science and technology, people's lives are full of various mobile terminals, such as mobile phones, smart bracelets, smart watches, tablets or pads, notebooks, and other electronic devices. Electric energy required for using such electronic device is basically supplied by a rechargeable battery. When the rechargeable battery in the electronic device is required to be charged, a user connects a charging connector on the electronic device to an external power supply through a charging cable, so as to charge the battery in the electronic device. If the user fails to unplug the charging cable in time to disconnect the external power supply from the electronic device when the battery is fully charged, the battery will be at a high potential for a long time, thus causing a rapid loss of battery capacity and even shortening the service life of the battery. Therefore, the electronic device is designed with a charging time protection mechanism, so as to control a maximum charging time, thus avoiding the damage to the battery caused by long-term charging.

However, in some usage scenarios, current charged into the battery will be lowered by power consumption to cause slow charging. As a result, the battery of the electronic device is not fully charged. That is, the charging is stopped because the charging time reaches a charging protection time. At this moment, even if the electronic device is still connected to the external power supply, the electronic device cannot be charged, thus causing experience defects.

SUMMARY OF THE INVENTION

However, when a system is overloaded and a charging signal is continuously started, for example, when charging is carried out in high power consumption scenarios such as playing games, even if a battery is allowed to be charged, the battery can only be charged with a very small current. Therefore, it is likely to enter charging timeout protection when the battery is not fully charged. For example, the battery stops being charged automatically due to a charging timeout after being charged for more than 12 hours (hrs). At this moment, even if an electronic device is still connected to an external power supply, the electronic device cannot be charged.

In an embodiment, a charging method includes: detecting a system power; confirming that a hybrid power operation is executed when the system power is not less than a preset power and a hybrid power mechanism is turned on; forcibly disabling a timing operation when the hybrid power operation is executed; confirming that a charging operation is executed when the system power is less than the preset power; starting the timing operation to accumulate a charging time when starting to execute the charging operation; and forcibly stopping the charging operation when the charging time is longer than a preset time.

In an embodiment, an electronic device with hybrid power includes: a system circuit, a charging and discharging circuit, a power connector, batteries, a timer, and a controller. The system circuit has a system power. The charging and discharging circuit is connected to the system circuit. The power connector is connected to the charging and discharging circuit, and is adapted to receive an external power. Each battery is connected to the charging and discharging circuit, and has an electricity. The connector is connected to the system circuit, the charging and discharging circuit, and the timer, and has a hybrid power mechanism. The controller is configured to confirm that the charging and discharging circuit executes a hybrid power operation when the system power is not less than a preset power and the hybrid power mechanism is turned on, and to forcibly stop the timer.

To sum up, the electronic device with the hybrid power mechanism and the charging method in any embodiment can allow the batteries to be charged in usage scenario for a high-power consumption and avoid entering charging timeout protection when the batteries are not fully charged.

BRIEF DESCRIPTION OF DRAWINGS

FIG. 2 is a flowchart of a charging method in an embodiment when a hybrid power mechanism is turned on.

FIG. 3 is a flowchart of a charging method in an embodiment when a hybrid power mechanism is not turned on.

DETAILED DESCRIPTION OF THE INVENTION

Figure 1:
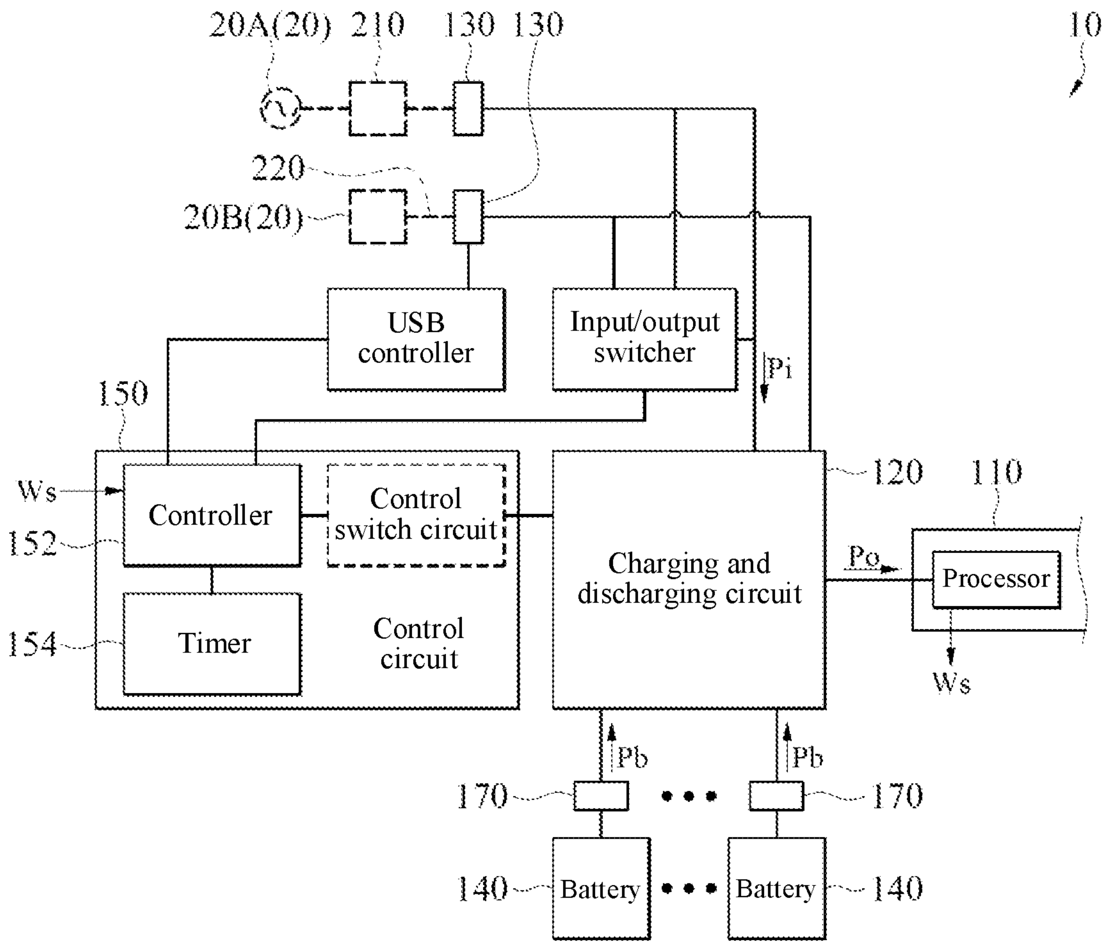
FIG. 1 is a functional block diagram of an electronic device with a hybrid power mechanism in an embodiment.

"Coupled" or "connected" as used herein may mean that two or more elements are in direct physical or electrical contact with each other, or are in indirect physical or electrical contact with each other, where practiced as possible. The so-called "indirect" refers to the presence of intermediate objects or physical spaces between objects. Also, the terms "first," "second," "third," and "fourth" used herein are intended to differentiate elements referred to, not to order or limit the differences between the elements, nor to limit the scope of the present disclosure. In addition, the shapes, dimensions, and proportions of the elements in the drawings, as well as the sequence of the process steps are for illustration only, are intended to be understood by those skilled in the art, and are not intended to limit the scope of implementation of the present disclosure.

Referring to FIG. 1, an electronic device with hybrid power (hereinafter referred to as an electronic device 10) includes a system circuit 110, a charging and discharging circuit 120, one or more power connectors 130, one or more batteries 140, and a control circuit 150. For clarity of description, FIG. 1 is drawn with the electronic device 10 having two power connectors 130, although the present disclosure is not limited to this number. The electronic device 10 may be designed to have only a single power connector 130 or to have three or more power connectors 130 depending on actual needs. Likewise, FIG. 1 is drawn with the electronic device 10 having two batteries 140, although the present disclosure is not limited to this number. The electronic device 10 may be designed to have only a single battery 140 or to have three or more batteries 140 depending on actual needs.

Here, the control circuit 150 includes a controller 152 and a timer 154. The connector 152 is coupled to the system circuit 110, the charging and discharging circuit 120, and the timer 154. Here, the timer 154 is controlled by the controller 152.

The power connector 130 is adapted to be coupled to an external power supply 20. Specifically, the electronic device 10 receives power Pi supplied by the external power supply 20 via the power connector 130.

Each battery 140 stores an electricity, and supplies a power Pb based on the stored electricity. The charging and discharging circuit 120 is coupled to the system circuit 110, the power connector 130, and each battery 140, and is configured to supply power to various components of the electronic device 10, such as the system circuit 110, the controller 152, and the timer 154. Specifically, a first end of the charging and discharging circuit 120 is coupled to the power connector 130, a second end of the charging and discharging circuit 120 is coupled to each battery 140, and a power end of the charging and discharging circuit 120 is coupled to various components of the electronic device 10 (such as the system circuit 110, the controller 152, and the timer 154). Here, a control end of the charging and discharging circuit 120 is further coupled to the controller 152. In other words, the charging and discharging circuit 120 is controlled by the controller 152.

When the electronic device 10 is in operation, the controller 152 detects a system power Ws and performs control in response to the system power Ws. Here, the controller 152 has a hybrid power mechanism. When the hybrid power mechanism is turned on, the charging and discharging circuit 120 supplies a power Po required for operation to the various components of the electronic device 10 with the power Pi from the external power supply 20 and/or the power Pb from the batteries 140 according to the system power Ws. In addition, when the hybrid power mechanism is turned on, the charging and discharging circuit 120 keeps a charging path of one battery 140 on (that is, the battery 140 is connected to the power connector 130). Herein, the system power may be total power for the electronic device 10.

In some embodiments, the controller 152 may provide a presetting window. A user may preset the on or off of the hybrid power mechanism in the presetting window through a user interface (not shown) of the electronic device 10, thereby turning on or off the hybrid power mechanism.

Figure 2:
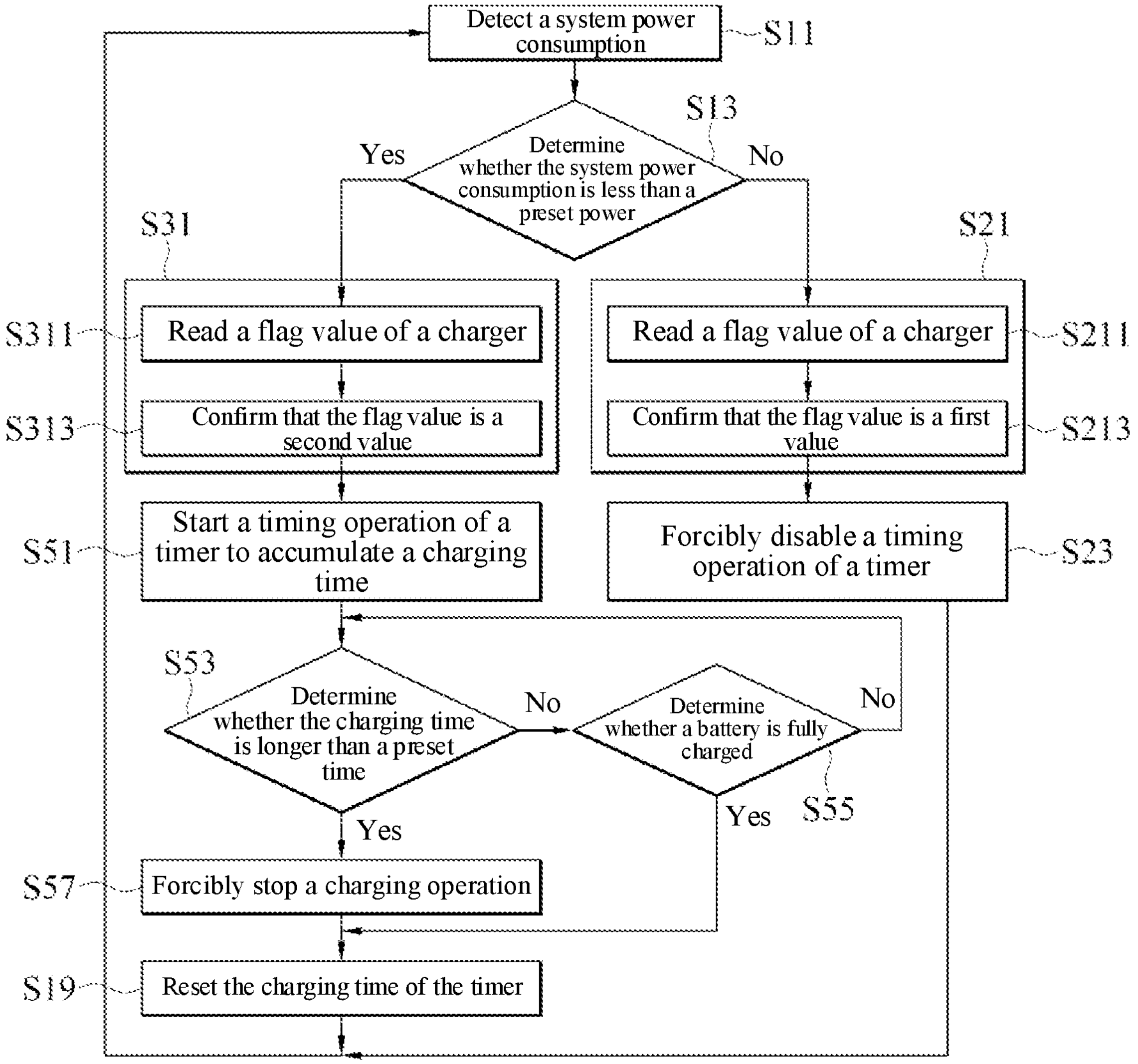

Referring to FIG. 1 and FIG. 2, when the user uses the electronic device 10 with the hybrid power mechanism turned on, the controller 152 detects the system power Ws (step S11), and compares the system power Ws with a preset power to confirm whether the system power Ws is less than the preset power (step S13).

When the system power Ws is not less than the preset power, the controller 152 confirms that the charging and discharging circuit 120 executes a hybrid power operation (step S21). In the hybrid power operation, the controller 152 controls the charging and discharging circuit 120 to turn on a discharging path of at least one battery 140 (that is, the battery 140 is connected to the power end of the charging and discharging circuit 120), and forcibly stops a timing operation of the timer 154 (step S23). Specifically, when the hybrid power mechanism is turned on, the charging and discharging circuit 120 keeps a charging path of one battery 140 on, and the controller 152 starts the timing operation of the timer 154 in response to any charging switch being turned on. However, when the system power Ws is not less than the preset power, the batteries 140 are in a discharged state. In other words, the charging and discharging circuit 120 supplies the power Po required for operation to the various components of the electronic device 10 with the power Pi from the external power supply 20 and the power Pb from the batteries 140. Therefore, when the hybrid power operation starts to be executed, the controller 152 forcibly stops the timing operation of the timer 154 (step S23). In some embodiments, if there are multiple batteries 140, the charging and discharging circuit 120 keeps a charging path of one battery 140 on and turns off charging paths of the other batteries 140 in the hybrid power operation, thereby avoiding mutual charging of voltages of the batteries 140.

In some embodiments, in step S23, after confirming that the charging and discharging circuit 120 executes a hybrid power operation, the controller 152 forcibly resets a charging time of the timer 154, thereby forcibly stopping the timing operation of the timer 154.

When the system power Ws is less than the preset power, the controller 152 confirms that a charging operation is executed (step S31). In the charging operation, the controller 152 controls the charging and discharging circuit 120 to turn on the charging path of at least one battery 140, and the controller 152 starts the timing operation of the timer 154 to accumulate a charging time in response to any charging switch being turned on (step S51), so as to determine whether the charging time is longer than a preset time (step S53). At this moment, the controller 152 controls the charging and discharging circuit 120 to turn off the discharging path of each battery 140. Specifically, when the system power Ws is less than the preset power, the batteries 140 are in a charged state. That is, the power Po required for operation is supplied by the charging and discharging circuit 120 to the various components of the electronic device 10 with the power Pi from the external power supply 20, and the batteries 140 with the charging paths turned on are charged. In some embodiments, if there are multiple batteries 140, the controller 152 performs parallel charging or sequential charging depending on the design of a charging program. In other words, if parallel charging is performed, the controller 152 controls the charging and discharging circuit 120 to turn on the charging path of each battery 140 (namely, to charge all the batteries 140 at the same time). If sequential charging is performed, the controller 152 controls the charging and discharging circuit 120 to turn on the charging paths of the batteries 140 one by one, so as to charge the batteries 140 in sequence (namely, to charge one battery 140 at a time).

Figure 3:
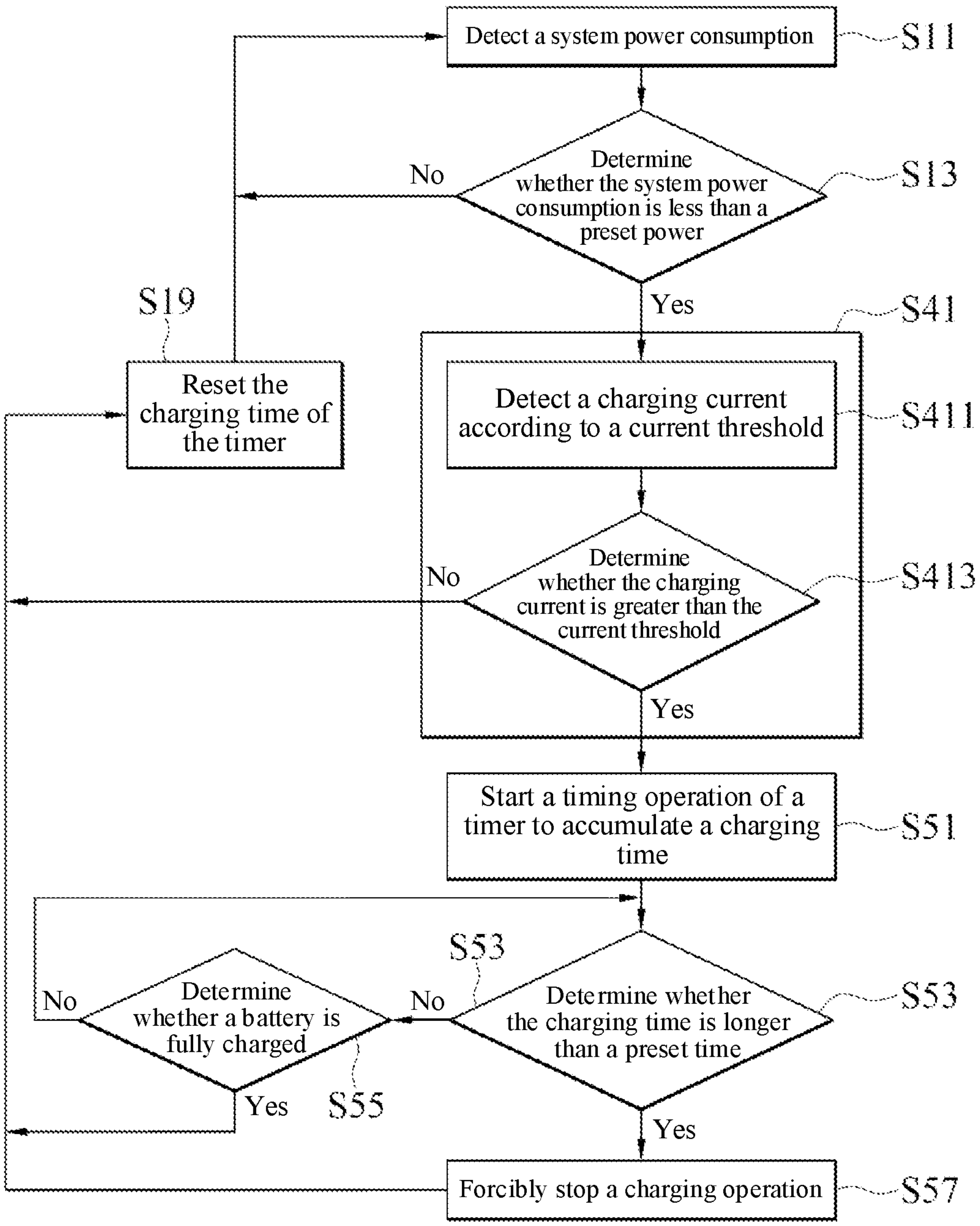

In some embodiments, referring to FIG. 1 and FIG. 3, when the user uses the electronic device 10 with the hybrid power mechanism not turned on, the controller 152 also detects the system power Ws (step S11), and compares the system power Ws with a preset power to confirm whether the system power Ws is less than the preset power (step S13).

When the system power Ws is not less than the preset power, the charging and discharging circuit 120 executes a separate power operation. Under the separate power operation, the controller 152 controls the charging and discharging circuit 120 to turn on a power path of a single power supply. At this moment, the charging and discharging circuit 120 supplies the power Po required for operation to the various components of the electronic device 10 with the power Pi from the external power supply 20 or the power Pb from the batteries 140. In other words, the controller 152 controls the charging and discharging circuit 120 to turn on one of the power connector 130 and the batteries 140 to the system circuit 110, so as to supply the power Po to the system circuit 110 by the external power supply 20 or the batteries 140. At this moment, the controller 152 controls the charging and discharging circuit 120 to turn off the charging path of each battery 140. That is, the charging switch coupled to each battery 140 in the charging and discharging circuit 120 is turned off. Therefore, the controller 152 does not start the timing operation of the timer 154.

In some embodiments, in the separate power operation, the controller 152 may determine the power sequence of the external power supply 20 and the batteries 140 according to the magnitude of electricity or a preset priority. That is, the charging and discharging circuit 120 is controlled to select the external power supply 20 or the batteries 140 as a power source. A control technology for the power sequence may adopt a monitoring technology well known in the art, and will not be described in detail herein.

When the system power Ws is less than the preset power, the controller 152 detects the execution of a charging operation (step S41). In step S41, the controller 152 detects a charging current according to a current threshold (step S411), so as to determine whether the charging operation is executed based on whether the charging current is greater than the current threshold (step S413). Specifically, when the system power Ws is less than the preset power, the controller 152 controls the charging and discharging circuit 120 to turn on the charging path of one battery 140. Therefore, the charging switch coupled to the battery 140 in the charging and discharging circuit 120 is turned on. At this moment, the discharging path coupled to each battery 140 in the charging and discharging circuit 120 is in an off state. In some embodiments, if there are multiple batteries 140, the controller 152 performs parallel charging or sequential charging depending on the design of the charging program. In other words, if parallel charging is performed, the controller 152 controls the charging and discharging circuit 120 to turn on the charging path of each battery 140 (namely, to charge all the batteries 140 at the same time). If sequential charging is performed, the controller 152 controls the charging and discharging circuit 120 to turn on the charging paths of the batteries 140 one by one, so as to charge the batteries 140 in sequence (namely, to charge one battery 140 at a time).

When the charging current is greater than the current threshold, it represents that the charging operation is being executed. That is, the charging and discharging circuit 120 supplies the power Po required for operation to the various components of the electronic device 10 with the power Pi from the external power supply 20, and the batteries 140 with the charging paths turned on are charged. At this moment, the controller 152 starts the timing operation of the timer 154 to accumulate a charging time in response to the charging switch of at least one battery 140 being turned on (step S51), so as to determine whether the charging time is longer than a preset time (step S53).

When the charging current is not greater than the current threshold, it represents that the charging operation is not executed although the charging switch of at least one battery 140 is turned on. That is, the charging and discharging circuit 120 does not charge any battery 140 with the power Pi from the external power supply 20. At this moment, the controller 152 starts the timing operation of the timer 154 in response to the charging switch of at least one battery 140 being turned on, and then forcibly resets the charging time of the timer 154 (step S19).

After step S53, when the charging time is not greater than the preset time (that is, the charging time does not exceed the preset time), the controller 152 controls the charging and discharging circuit 120 to keep turning on the charging path, and the timer 154 continues accumulating the charging time until the batteries 140 are fully charged (step S55) or the charging time is greater than the preset time. In other words, when the batteries 140 are fully charged, the controller 152 resets the charging time of the timer 154 (that is, the timing operation of the timer 154 is stopped) (step S19). Conversely, when the charging time is longer than the preset time, the controller 152 forces the charging and discharging circuit 120 to stop the charging operation (step S57) and resets the charging time of the timer 154 (step S19).

In some embodiments, the current threshold may be 0 amps (A).

In some embodiments, the preset power may be 58 watts (w).

In some embodiments, the preset time may be 12 hours (hr).

Figure 4:
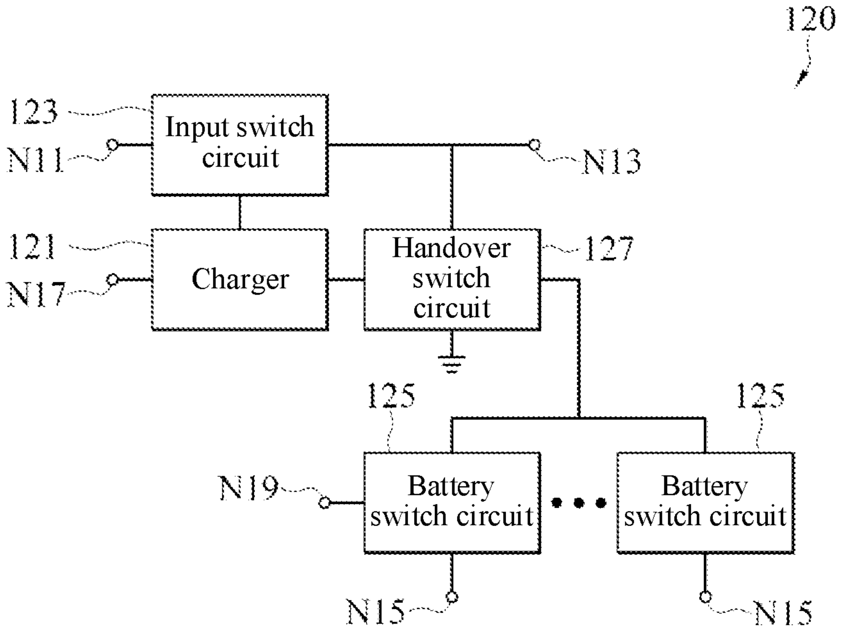
FIG. 4 is a functional block diagram of an example of a charging and discharging circuit of FIG. 1.

In some embodiments, referring to FIG. 1 and FIG. 4, the charging and discharging circuit 120 includes a charger 121, an input switch circuit 123, at least one battery switch circuit 125, and a handover switch circuit 127.

The charger 121 is coupled to the controller 152 via a contact N17, and is controlled by the controller 152. In other words, the controller 152 may enable the charger 121 and then communicate with the charger 121, so as to determine an operation executed by the charging and discharging circuit 120. Furthermore, the controller 152 further controls an on state of each battery switch circuit 125 in response to an operation to be executed by the charging and discharging circuit 120, so as to determine whether each battery 140 is in a charged state or discharged state.

The input switch circuit 123 is coupled between the system circuit 110 and the power connector 130, and is controlled by the charger 121. In other words, one end of the input switch circuit 123 is coupled to the power connector 130 via a contact N11, and the other end is coupled to the system circuit 110 via a contact N13.

The battery switch circuits 125 correspond to the batteries 140 one by one. Here, the battery switch circuit 125 is coupled between the handover switch circuit 127 and the corresponding battery 140, and is controlled by the controller 152. In other words, one end of the battery switch circuit 125 is coupled to the handover switch circuit 127, and the other end is coupled to the corresponding battery 140 via a contact N15. The control end of the battery switch circuit 125 is coupled to the control circuit 150 via a contact N19.

The handover switch circuit 127 is coupled between the system circuit 110 and each battery switch circuit 125, and is controlled by the charger 121. In other words, one end of the handover switch circuit 127 is coupled to the system circuit 110 via the contact N13, and the other end is coupled to each battery 140 via the contact N15. Here, the handover switch circuit 127 includes a charging switch of each battery 140.

Here, the charger 121 controls the on state of the input switch circuit 123 and the on state of the handover switch circuit 127 in response to an operation to be executed by the charging and discharging circuit 120 (namely, a charging operation or a discharging operation).

In some embodiments, the charger 121 stores a flag value, and the flag value is representative of a current operation of the charging and discharging circuit 120. When the hybrid power mechanism is turned on, the controller 152 may read the flag value of the charger 121 and determine the operation executed by the charging and discharging circuit 120 from the read flag value. Here, there are at least two flag values of the charger 121, and the two flag values are a first value and a second value which are different from each other. When the flag value of the charger 121 is the first value, the operation executed by the charging and discharging circuit 120 is the power operation. When the flag value of the charger 121 is the second value, the operation executed by the charging and discharging circuit 120 is the charging operation.

In some embodiments, in step S21, the controller 152 reads the flag value of the charger 121 (step S211), and confirms that the flag value is a first value (step S213). In step S31, the controller 152 reads the flag value of the charger 121 (step S311), and confirms that the flag value is a second value (step S313).

In some embodiments, the first value may be "1" and the second value is "0".

In some embodiments, the electronic device 10 may further include battery connectors 170, as shown in FIG. 1. The battery connectors 170 correspond to the battery switch circuits 125 one by one, and correspond to the batteries 140 one by one. Each battery connector 170 is coupled between the corresponding battery switch circuit 125 and the corresponding battery 140. At this moment, each battery 140 is detachably assembled on the corresponding battery connector 170 and electrically connected to the corresponding battery switch circuit 125 via the corresponding battery connector 170.

In some embodiments, the batteries 140 may be fixedly assembled in the electronic device 10 (not shown).

Figure 5:
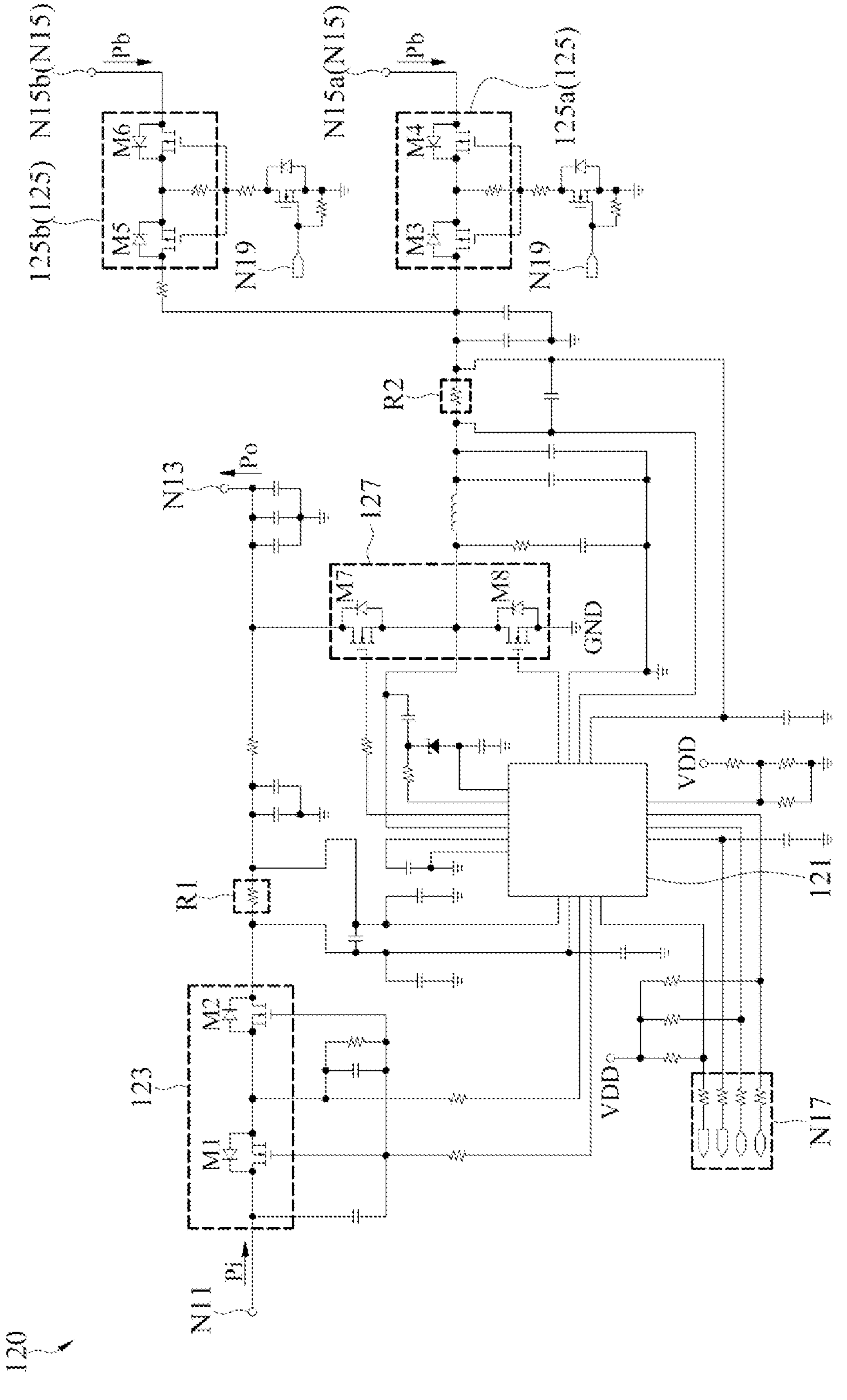
FIG. 5 is a circuit diagram of another example of the charging and discharging circuit of FIG. 1.

In some embodiments, referring to FIG. 1 and FIG. 5, first to fourth pins of the charger 121 are respectively coupled to the controller 152 via the contact N17 and communicate with the controller 152 via the contact N17. The first to fourth pins of the charger 121 are also coupled to a power voltage VDD via resistors, respectively. The power voltage VDD may be 3.3 V.

In some embodiments, the input switch circuit 123 includes two transistors M1, M2 connected in series between the contact N11 and the contact N13. In other words, a first end of the transistor M1 is coupled to the contact N11. A second end of the transistor M1 is coupled to a second end of the transistor M2. A first end of the transistor M2 is coupled to the contact N13. A fifth pin of the charger 121 connects a control end of the transistor M1 and a control end of the transistor M2. A sixth pin of the charger 121 connects the second end of the transistor M1 and the second end of the transistor M2. The contact N11 is coupled to the power connector 130. The contact N13 is coupled to power ends of the various components of the electronic device 10, for example, to the system circuit 110 (such as a power pin of a processor), a power pin of the controller 152, a power pin of the timer 154, and the like.

Here, the charger 121 controls whether the transistors M1, M2 are turned on or not, so that the power Pi inputted to the electronic device 10 via the contact N11 and the power connector 130 may flow through the transistors M1, M2, thereby outputting the power Po to the various components of the electronic device 10 via the contact N13.

In some embodiments, the charging and discharging circuit 120 may further include a current detector R1, and the current detector R1 is coupled between the input switch circuit 123 (namely, the first end of the transistor M2) and the contact N13.

As described above, a seventh pin and an eighth pin of the charger 121 are respectively coupled to two ends of the current detector R1. The current detector R1 converts the external power Pi into a corresponding voltage and supplies the voltage to the charger 121. In other words, the charger 121 may detect the power Pi via the current detector R1.

In some embodiments, as described above, the charging and discharging circuit 120 has two battery switch circuits 125 (namely, 125*a*, 125*b*), and each battery switch circuit 125 is coupled between the handover switch circuit 127 and the corresponding contact N15 (namely, N15*a*, N15*b*). The two contacts N15*a*, N15*b* are respectively directly coupled to the two batteries 140 or are respectively coupled to the two batteries 140 via the two battery connectors 170.

The battery switch circuit 125*a* includes two transistors M3, M4 connected in series between the handover switch circuit 127 and the contact N15*a*. The battery switch circuit 125*b* includes two transistors M5, M6 connected in series between the handover switch circuit 127 and the contact N15*b*. In other words, a first end of the transistor M3 is coupled to the handover switch circuit 127. A second end of the transistor M3 is coupled to a second end of the transistor M4. A first end of the transistor M4 is coupled to the contact N15*a*. A first end of the transistor M5 is coupled to the handover switch circuit 127. A second end of the transistor M5 is coupled to a second end of the transistor M6. A first end of the transistor M6 is coupled to the contact N15*b*. Control ends of the transistors M3 to M6 are coupled to the controller 152 via the contact N19, and the controller 152 controls whether the transistors M3 to M6 are turned on or not according to the charging and discharging operations of the batteries 140.

As described above, the handover switch circuit 127 includes two transistors M7, M8 connected in series between the contact N13 and a ground GND. In other words, a first end of the transistor M7 is coupled to the contact N13. A second end of the transistor M7 is coupled to a second end of the transistor M8. A first end of the transistor M8 is coupled to the ground GND. A ninth pin of the charger 121 connects a control end of the transistor M7 and the control end of the transistor M2. A tenth pin of the charger 121 connects a control end of the transistor M8 and the control end of the transistor M2. Here, the charger 121 controls whether the transistors M7, M8 are turned on or not according to the charging and discharging operations of the batteries 140.

In some embodiments, the charging and discharging circuit 120 may further include a current detector R2. The batteries 140 are coupled to the charging and discharging circuit 120 in parallel. In this example, the current detector R2 is coupled between the handover switch circuit 127 and each battery switch circuit 125. Specifically, as described above, one end of the current detector R2 is coupled to the second end of the transistor M7 and the second end of the transistor M8. The other end of the current detector R2 is coupled to the first end of the transistor M3 and the first end of the transistor M5.

The ninth pin and the tenth pin of the charger 121 are respectively coupled to two ends of the current detector R2. The current detector R2 converts the power Pb supplied from the batteries 140 or power (not shown) charged into the batteries 140 into a corresponding voltage and supplies the voltage to the charger 121. In other words, the charger 121 may detect the power Pb outputted from the batteries 140 or the power inputted to the batteries 140 via the current detector R2.

In some embodiments, the charger 121 may be implemented by a chip. The chip may be, for example, BQ24735, BQ25792, MAX77829, or LTC4015.

In some embodiments, each current detector R1/R2 may be an impedance element such as a resistor, a capacitor, or an inductor.

In some embodiments, the transistors M1, M2, M7, M8 and the transistors M3, M4, M5, M6 may be transistors of different types of channels. In some embodiments, the transistors M1 to M8 may be switch devices such as N-type transistors, P-type transistors, bipolar junction transistors (BJT), or insulated gate bipolar junction transistors (IGBT). For example, when the transistors M1, M2, M7, M8 are the N-type transistors, the transistors M3, M4, M5, M6 are the P-type transistors.

Figure 6:
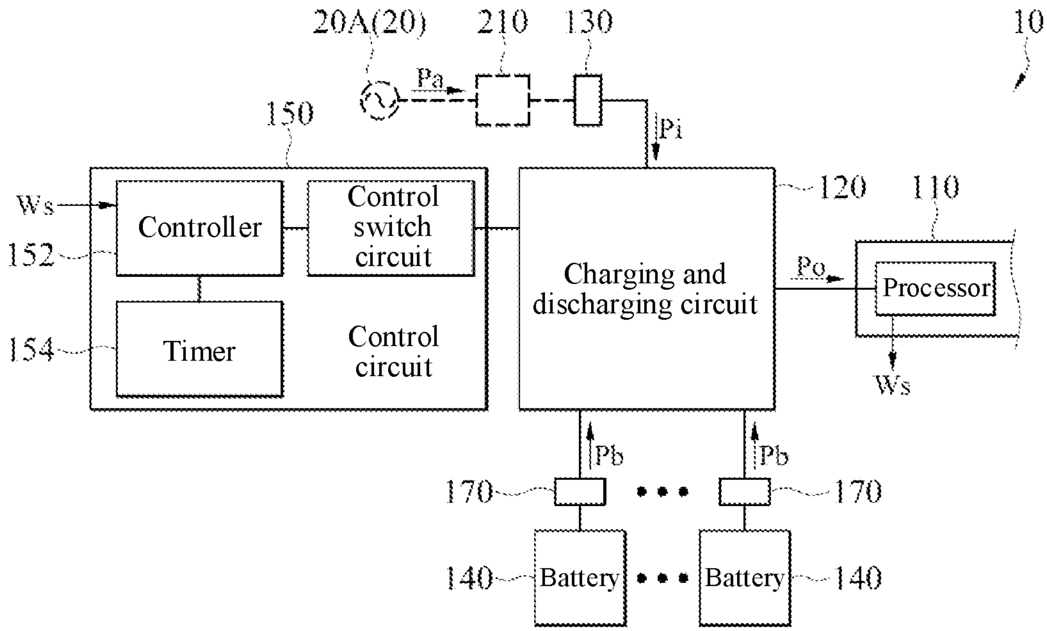
FIG. 6 is a functional block diagram of an electronic device with a hybrid power mechanism in another embodiment.

In some embodiments, referring to FIG. 6, the external power supply 20 may be a mains supply 20A, and the power connector 130 may be connected to the mains supply 20A via a power adapter 210. In other words, two ends of the power adapter 210 are coupled to the power connector 130 and the mains supply 20A respectively. The power adapter 210 receives an alternating current power Pa supplied from the mains supply 20A, converts the received alternating current power Pa into a direct current power Pi, and supplies the direct current power Pi to the electronic device 10 via the power connector 130.

Figure 7:
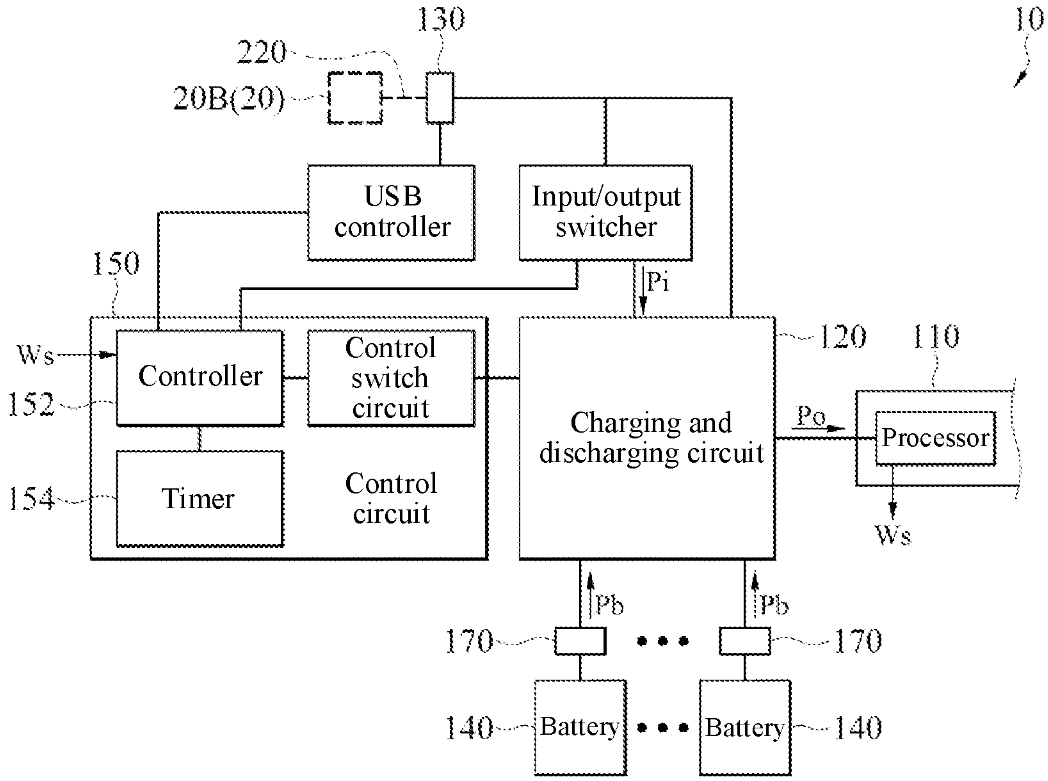
FIG. 7 is a functional block diagram of an electronic device with a hybrid power mechanism in still another embodiment.

In other embodiments, referring to FIG. 7, the external power supply 20 may be another electronic device 20B, and the power connector 130 may be connected to the electronic device 20B via a universal serial bus (USB) transmission line 220. In other words, two ends of the USB transmission line 220 are coupled to the power connector 130 and the electronic device 20B respectively. Here, the electronic device 20B supplies the direct current power Pi to the electronic device 10 via the USB transmission line 220 and the power connector 130.

In still other embodiments, the external power supply 20 may be implemented by the mains supply 20A in conjunction with the another electronic device 20B, as shown in FIG. 1. In an example, the electronic device 10 may select to receive the external power Pi supplied from at least one of the mains supply 20A and the electronic device 20B depending on the power status of the mains supply 20A and the electronic device 20B.

In some embodiments, the foregoing electronic device 10 may be a smart phone, a navigator (PND), a digital photo frame (PDF), an e-book, a notebook, a tablet or pad, or the like.

In some embodiments, the foregoing electronic device 20B may be an on-the-go (OTG) device or a fast charging device or the like. For example, the electronic device 20B may be a hand-held electronic device, a personal computer, a car cigarette lighter, a home appliance, and the like. The hand-held electronic device may be a smart phone, a navigator, a notebook, or a tablet or pad, or the like.

In some embodiments, the types of the batteries 140 may be dry batteries, lithium batteries, nickel-metal hydride batteries, lead-acid batteries or solar batteries or combinations of other conventional batteries.

In some embodiments, the controller 152 may be an embedded controller.

In some embodiments, the controller 152 and the timer 154 may be integrated into a single chip.

To sum up, the electronic device 10 with the hybrid power mechanism and the charging method in any embodiment can allow the batteries 140 to be charged in usage scenario for a high-power consumption and avoid entering charging timeout protection when the batteries 140 are not fully charged.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A charging method, comprising:
- detecting a system power;
- confirming that a hybrid power operation is executed when the system power is not less than a preset power and a hybrid power mechanism is turned on;
- forcibly disabling a timing operation when the hybrid power operation is executed;
- confirming that a charging operation is executed when the system power is less than the preset power;
- starting the timing operation to accumulate a charging time when starting to execute the charging operation; and
- forcibly stopping the charging operation when the charging time is longer than a preset time.

2. The charging method according to claim 1, wherein the step of confirming that the hybrid power operation is executed comprises: reading a flag value of a charger and confirming that the flag value is a first value.

3. The charging method according to claim 2, wherein the step of confirming that t the charging operation is executed comprises: reading the flag value of the charger and confirming that the flag value is a second value when the hybrid power mechanism is turned on.

4. The charging method according to claim 1, wherein the step of confirming that the charging operation is executed comprises: detecting a charging current when the hybrid power mechanism is turned off, wherein the charging operation starts to be executed when the charging current is greater than 0, and the charging operation is not executed when the charging current is not greater than 0.

5. The charging method according to claim 1, wherein the step of forcibly disabling the timing operation comprises: resetting the charging time.

6. The charging method according to claim 1, further comprising:
- continuing executing the charging operation when the charging time does not reach the preset time, until the charging operation is completed or the charging time is longer than the preset time; and
- stopping the timing operation and resetting the charging time when the charging operation is completed.

7. An electronic device with hybrid power, comprising:
- a system circuit, having a system power;

a charging and discharging circuit, connected to the system circuit;

a power connector, connected to the charging and discharging circuit and adapted to receive an external power supply; and at least one battery, connected to the charging and discharging circuit, each battery having an electricity;

a timer; and a controller, connected to the system circuit, the charging and discharging circuit, and the timer, the controller having a hybrid power mechanism, wherein the controller is configured to confirm that the charging and discharging circuit has executed a hybrid power operation when the system power is not less than a preset power and the hybrid power mechanism is turned on, and to forcibly stop the timer.

8. The electronic device with hybrid power according to claim 7, wherein the charging and discharging circuit comprises a charger, the charger is connected to the controller, and the controller confirms that the charging and discharging circuit has executed the hybrid power operation by reading a flag value of the charger and confirming that the flag value is a first value.

9. The electronic device with hybrid power according to claim 7, wherein the controller is further configured to confirm that the charging and discharging circuit executes a charging operation when the system power is less than the preset power.

10. The electronic device with hybrid power according to claim 9, wherein the charging and discharging circuit comprises a charger, the charger is connected to the controller, and the controller confirms that the charging and discharging circuit executes the charging operation by reading a flag value of the charger and confirming that the flag value is 0 when the hybrid power mechanism is turned on.

11. The electronic device with hybrid power according to claim 9, wherein the controller confirms that the charging and discharging circuit executes the charging operation by detecting a charging current according to a current threshold when the hybrid power mechanism is turned off.

12. The electronic device with hybrid power according to claim 11, wherein the charging and discharging circuit executes the charging operation when the charging current is greater than the current threshold, and the charging and discharging circuit does not execute the charging operation when the charging current is not greater than the current threshold.

13. The electronic device with hybrid power according to claim 9, wherein the controller is further configured to start the timer to accumulate a charging time when the charging and discharging circuit starts to execute the charging operation, and to force the charging and discharging circuit to stop executing the charging operation when the charging time reaches a preset time.

14. The electronic device with hybrid power according to claim 7, wherein the controller forcibly stops the timer by resetting the timer.

* * * * *